United States Patent [19]

Steinberg et al.

[11] 4,111,704
[45] Sep. 5, 1978

[54] PRINTING PASTE

[75] Inventors: Friedhelm Steinberg, Finnentrop; Günter Voss, Neuenrade, both of Fed. Rep. of Germany

[73] Assignee: Metallgesellschaft Aktiengesellschaft, Frankfurt am Main, Fed. Rep. of Germany

[21] Appl. No.: 782,799

[22] Filed: Mar. 30, 1977

[30] Foreign Application Priority Data

Apr. 2, 1976 [DE] Fed. Rep. of Germany ....... 2614232

[51] Int. Cl.² .............................................. C09D 11/14
[52] U.S. Cl. ..................................... 106/25; 106/208; 106/209
[58] Field of Search .................... 106/24, 25, 208, 209

[56] References Cited

U.S. PATENT DOCUMENTS

| | | | |
|---|---|---|---|
| 3,385,716 | 5/1968 | Jagaciak et al. ......................... | 106/2 |
| 3,446,647 | 5/1969 | Rizner .................................... | 106/24 |

*Primary Examiner*—Lorenzo B. Hayes
*Attorney, Agent, or Firm*—Burgess, Dinklage & Sprung

[57] ABSTRACT

A printing paste for marking non-weldable areas in the manufacture of ducted plates. The paste is composed of approximately equal parts by weight of (A) a dispersion comprising about 5 to 60% by weight of titanium dioxide, about 0.10 to 4% by weight of magnesium montmorillonite, up to about 10% by weight of silica and the balance of water, and (B) a dispersion comprising about 25 to 35 parts by weight of alginate, about 50 to 70 parts by weight of chemically pure silica having a submicroscopic particle size, 2 to 4 parts by weight of highly concentrated ammonia solution, and about 1000 parts by weight of water.

1 Claim, No Drawings

PRINTING PASTE

BACKGROUND OF THE INVENTION

This invention relates to a printing paste for marking non-weldable areas in the manufacture of so-called ducted plates, in which at least two metal plates consisting preferably of aluminum or aluminum alloys are joined by sealed assembly rolling.

In the above-described manufacture of so-called ducted plates, a sealed assembly rolling step, which is conventional also for cladding is employed in which at least two superimposed plates are preheated, if desired and are then firmly joined by the rolling pressure, whereby the thickness of the plates can be more or less decreased in conjunction with a corresponding stretching of the plates in length. Whereas the plates are normally joined throughout their interface by sealed assembly rolling, it is desired in the manufacture of so-called ducted plates to leave certain areas unwelded, in a predetermined pattern, so that the assembly can be subsequently expanded by the supply of a pressure fluid to form a duct or cavity system for receiving or transferring a flowable heat-carrying medium. Such ducted plates have found wide use as evaporators in refrigerators, freezers or the like.

Whereas graphite in various dispersions has been used to avoid a welding in predetermined areas, it has been found that difficulties often arise when graphite is applied by screen process printing, because the contours of the "picture" are not sharp enough since the graphite paste cannot be properly squeezed through the screen and/or because it does not sufficiently adhere to the marked plate and is peeled off in part as the screen is lifted from the plate. It has also been found that graphite cannot be completely removed from the expanded duct system and that the residual graphite in conjunction with some heat-carrying media may give rise to corrosion.

For this reason it has already been proposed to provide a graphite-free, weld-resist composition which consists of an aqueous dispersion of 5 to 60% by weight of titanium dioxide, 0.5 to 5% by weight of bentonite, 0.10 to 4% by weight of magnesium montmorillonite and, if desired, 0.1 to 10% by weight of silica, and the balance of water (German Patent Specification No. 1,508,342). Whereas this mixture separates easily from the screen, difficulties arising in its use residue in that it does not completely cover the areas to be printed and that it contracts, owing to a high surface tension, so that the plates were welded together also in parts of the areas which are not to be welded. In many cases, the formation of the ducts exactly in accordance with a predetermined pattern is decisive for the function of equipment in which the ducted plate is used. For this reason, the known weld-resist composition cannot be used with satisfactory results where the dimensional accuracy of the duct pattern need meet particularly stringent requirements.

For a long time, the applicant has marked non-weldable areas in the manufacture of ducted plates with a graphite-free printing paste consisting of a dispersion of 25 to 35 grams of a water-soluble alginate such as ammonium alginate, 50 to 70 grams of Aerosil and 2 to 4 ml of highly concentrated ammonia solution in 1000 ml of water. Whereas that printing paste has satisfactory printing properties, a dry coating formed by it does not satisfactorily separate the component plates so that very high pressures were required to inflate the ducts. Besides, that dispersion has to be used with very great care because a relatively great reduction in thickness by the rolling step (by which the thickness may be decreased down to 1/5 of the initial thickness) accompanied by corresponding stretching of the plates in length may so strongly reduce the separation of the component plates in certain areas that the ducts can no longer be inflated at all.

SUMMARY OF THE INVENTION

For this reason it is an object of the invention to provide a weld-resist printing paste which has such a consistency and viscosity that it permits of a formation of picture having sharp contours and adheres well to the metal, does not chip off or flake off when drying and resists elevated temperatures up to the temperature at which the plates are hot-formed and is capable of being stretched at least in a ratio of 1:5 in a dry state.

It has surprisingly been found that all requirements stated are fulfilled very well by a printing paste which is composed in accordance with the invention in approximately equal parts by weight of (A) a dispersion comprising about 5 to 60% by weight of titanium dioxide, about 0.10 to 4% by weight of magnesium montmorillonite, up to about 10% by weight of silica, and the balance of water and (B) a dispersion comprising about 25 to 35 g of a water-soluble alginate such as ammonium alginate, about 50 to 70 g of silica, e.g. chemically pure silica having a submicroscopic particle size and sold under the trade name Aerosil, and about 2 to 4 ml of highly concentrated ammonia solution in about 1000 ml of water.

This result is surprising because the previous efforts to develop a graphite-free printing paste were made in two greatly differing directions and have resulted in limited improvements in each of these directions. It was not to be expected that the printing pastes represented by the strongly different subcompositions A and B of the printing paste according to the invention could be mixed as desired and would supplement each other in their results. The printing paste according to the invention is superior to the two subcompositions as regards in printing properties and the separation which it affords between the two component plates and does not give rise to any difficulty during the handling of the ducted plates and the cleaning of the inflated ducts. Finally, it does not promote corrosion. the seemingly simple concept of combining the results of developments in two divergent directions has thus enabled the above-mentioned object to have resulted in a most advantageous accomplishment of the object stated above.

DETAILED DESCRIPTION OF THE INVENTION

Further details and advantages of the printing paste according to the invention will become apparent from the following example relating to its application.

EXAMPLE

The printing paste used in this Example has the following composition:
50% by weight of Dispersion A comprising
34% by weight of titanium dioxide
1.5% by weight of magnesium montmorillonite
7% by weight of silica 56.5% by weight of water and
50% by weight of Dispersion B comprising
30 g of ammonium alginate
60 g of Aerosil silica having submicroscopic particle size
3 ml of highly concentrated ammonia solution in 1000 ml of water.

In the manufacture of the ducted plate intended for use as an evaporator in a freezer a printing paste comprising
50% by weight of Dispersion A comprising
35% by weight of titanium dioxide
1.5% by weight of magnesium montmorillonite
7% by weight of silica
56.5% by weight of water and
50% by weight of Dispersion B comprising
30 g of ammonium alginate
60 g of Aerosil silica having a submicroscopic particle size
3 ml of highly concentrated ammonia solution in 1000 ml of water
is applied to an aluminum plate by screen printing in a pattern which corresponds to the desired duct pattern but is smaller in length to a proper scale. The printed coating has a thickness of about 5 microns. The coating is then dried at 230° C. for about 3 minutes by infrared radiation. A second aluminum plate is then applied to the printed surface of the printed plate and means are provided to prevent the plates from shifting relative to each other. Before being hot-rolled, this laminate is then heated to 500° C. within 12 minutes whereby the alginate of the printing paste is decomposed without residue. The laminate is subsequently hot-rolled in two passes, with a reduction of 45 to 55% in each pass, and is then cold-rolled in a single pass to the final thickness of the ducted plate.

The resulting weld-resist coatings permit separaion of the component plates of the resulting laminate when the same is expanded by an inflating pressure of about 70 bars whereas inflating pressures between 90 and 120 bars were required where the previously conventional graphite-containing printing pastes were used. The expanded plate can be cut to predetermined size and is ready for shipment unless additional processing steps such as painting, connection of pipelines, bending the plate to a box shape, etc. are desired.

The ammonia solution in component B desirably ranges in concentration from about 30 to 34 and preferably about 32 to 34% by weight.

It will be appreciated that the instant specification and example are set forth by way of illustration and not limitation, and that various modifications and changes may be made without departing from the spirit and scope of the present invention.

What is claimed is:

1. A printing paste for marking non-weldable areas in the manufacture of ducted plates in which at least two metal plates are joined by sealed assembly rolling, comprising approximately equal parts by weight of
    (A) a dispersion comprising
        about 5 to 60% of titanium dioxide based on the weight of dispersion (A), about 0.10 to 4% of magnesium montmorillonite based on the weight of dispersion (A), up to about 10% of silica based on the weight of dispersion (A), and the balance of water, and
    (B) a dispersion comprising
        about 25 to 35 parts by weight of alginate, about 50 to 70 parts by weight of silica having a submicroscopic particle size, about 2 to 4 parts by weight of highly concentrated ammonia solution, and about 1000 parts by weight of water.

* * * * *